(12) United States Patent
Horowitz et al.

(10) Patent No.: US 10,044,062 B2
(45) Date of Patent: Aug. 7, 2018

(54) SILICONE-CONTAINING IONIC MATERIALS

(71) Applicant: Tufts University, Boston, MA (US)

(72) Inventors: Ariel Horowitz, Somerville, MA (US); Matthew Panzer, Somerville, MA (US)

(73) Assignee: Tufts University, Boston, MA (US)

( * ) Notice: Subject to any disclaimer, the term of this patent is extended or adjusted under 35 U.S.C. 154(b) by 203 days.

(21) Appl. No.: 15/103,348

(22) PCT Filed: Dec. 15, 2014

(86) PCT No.: PCT/US2014/070265
§ 371 (c)(1),
(2) Date: Jun. 10, 2016

(87) PCT Pub. No.: WO2015/089498
PCT Pub. Date: Jun. 18, 2015

(65) Prior Publication Data
US 2016/0315349 A1    Oct. 27, 2016

Related U.S. Application Data

(60) Provisional application No. 61/915,793, filed on Dec. 13, 2013.

(51) Int. Cl.
| | |
|---|---|
| *H01M 10/0565* | (2010.01) |
| *H01G 11/56* | (2013.01) |
| *H01G 11/58* | (2013.01) |
| *H01M 10/0569* | (2010.01) |
| *H01M 10/0525* | (2010.01) |

(Continued)

(52) U.S. Cl.
CPC ........ *H01M 10/0565* (2013.01); *H01G 11/54* (2013.01); *H01G 11/56* (2013.01); *H01G 11/58* (2013.01); *H01G 11/62* (2013.01); *H01G 11/84* (2013.01); *H01M 10/0525* (2013.01); *H01M 10/0568* (2013.01); *H01M 10/0569* (2013.01); *H01M 2300/0022* (2013.01); *H01M 2300/0045* (2013.01); *H01M 2300/0085* (2013.01); *Y02E 60/13* (2013.01)

(58) Field of Classification Search
CPC ................................................ H01M 10/0565
USPC ......................................................... 429/303
See application file for complete search history.

(56) References Cited

U.S. PATENT DOCUMENTS

| | | | |
|---|---|---|---|
| 7,999,020 B2 | 8/2011 | Frisbie et al. | |
| 2008/0199687 A1* | 8/2008 | Chiruvolu | C09D 11/101 |
| | | | 428/331 |
| 2011/0236295 A1 | 9/2011 | Anderson et al. | |

FOREIGN PATENT DOCUMENTS

| | | |
|---|---|---|
| WO | WO-2010/002438 A1 | 1/2010 |
| WO | WO-2013/096211 A1 | 6/2013 |

OTHER PUBLICATIONS

Izak et al "Separation Properties of Supported Ionic Liquid-Polydimethylsiloxane Membrane in Pervaporation Process" Desalination vol. 241, pp. 182-187, 2009.

(Continued)

*Primary Examiner* — Basia A Ridley
*Assistant Examiner* — James Erwin
(74) *Attorney, Agent, or Firm* — Cesari & McKenna, LLP

(57) ABSTRACT

An ionic material that contains a crosslinked polydimethylsiloxane network and an ionic liquid and, optionally, a lithium salt. Also disclosed are a methods of preparing the above-described ionic material, as well as a battery and a capacitor each including the ionic material as an electrolyte.

22 Claims, 7 Drawing Sheets

Two SEM images of ionogel IM1 large domains of the crosslinked PDMS network (white) and the ionic liquid dispersed therein (gray)

ionogel IM1 bending under mild force

(51) Int. Cl.
*H01M 10/0568* (2010.01)
*H01G 11/54* (2013.01)
*H01G 11/62* (2013.01)
*H01G 11/84* (2013.01)

(56) References Cited

OTHER PUBLICATIONS

Ogoshi et al "Transparent Ionic Liquid-Phenol Resin Hybrids with High Ionic Conductivity" Polymer Journal vol. 43, pp. 421-424, 2011.

Pandey, et al., "Ionic liquid 1-ethyl-3-methylimidazolium tetracyanoborate-based gel polymer electrolyte for electrochemical capacitors", J. Mater. Chem. A, 2013, 1,3372-3378.

Visentin et al "Poly)Ethylene Glycol) Diacrylate-Supported Ionogels with Consistent Capacitive Behavior and Tunable Elastic Response" Applied Materials & Interfaces vol. 4, pp. 2836-2839, 2012.

\* cited by examiner

Two SEM images of ionogel IM1

1a) large domains of the crosslinked PDMS network (white) and the ionic liquid dispersed therein (gray)

1b) ionogel IM1 bending under mild force

Frequency sweep data for ionogel IM1

Stress/strain curves for ionogel IM1, demonstrating elastic behavior with hysteresis. IM1 showed signs of yield around 45% strain DSC heating curves An Arrhenius plot showing the variation of ionogel conductivity with temperature Ionogel electrical properties Impedance spectra comparisons

SILICONE-CONTAINING IONIC MATERIALS

CROSS REFERENCE TO RELATED APPLICATIONS

This application is the National Stage of International Application No. PCT/US2014/070265, filed on Dec. 15, 2014, which claims the benefit of U.S. Provisional Application No. 61/915,793, filed on Dec. 13, 2013. The contents of both applications are hereby incorporated by reference in their entirety.

GOVERNMENT SUPPORT

This invention was made with government support under grant W911QY-12-1-0011 awarded by the United States Army. The government has certain rights in the invention.

BACKGROUND

Solid or semi-solid ionic materials are useful for preparing, among others, solid electrolytes (e.g., gel electrolytes and dry polymer electrolytes). Improved safety and a wider operating temperature range result from use of solid electrolytes, instead of liquid electrolytes, in lithium-ion batteries, fuel cells, and capacitors.

Ionic liquids, contained in certain ionic materials, have desirable properties, such as negligible vapor pressure, thermal stability and non-flammability, high ionic conductivity, and a wide electrochemical stability window. However, it is difficult to prepare an ionic liquid-containing solid electrolyte that has a high ionic conductivity comparable to a neat ionic liquid.

A variety of structural support substrates, e.g., polymers, colloidal particles, carbon nanotubes, and small organic gelators, have been used to immobilize ionic liquids in solid or semi-solid ionic materials. See Horowitz and Panzer, Journal of Materials Chemistry 2012, 22, 16534-39. Polymer ionic materials have attracted tremendous interest as they can have a high ionic conductivity while existing in a non-liquid phase. See id; and Ogoshi et al., Polymer Journal 2011, 43, 421-24. These materials are typically prepared via self-assembly of block copolymers or via in situ thermally or UV initiated radical polymerization. See Horowitz and Panzer, supra. Nevertheless, polymer ionic materials thus prepared often display low thermal stability and high mechanical stiffness, and their successful preparation remains challenging. See id; and Visentin and Panzer, ACS Applied Materials & Interfaces 2012, 4, 2836-39.

There is a need to develop a thermally stable and mechanically flexible solid or semi-solid ionic material that has high ionic conductivity and can be easily and rapidly prepared at low cost.

SUMMARY

This invention relates to novel ionic materials that can be prepared readily and inexpensively, and have unexpectedly high thermal stability, mechanical flexibility, and ionic conductivity. These materials can be used as electrolytes in electronic devices including batteries and capacitors.

Within the scope of this invention is an ionic material containing a crosslinked polydimethylsiloxane (PDMS) network and an ionic liquid that dispersed within the PDMS network.

The PDMS network contains a plurality of repeat units of formula (I):

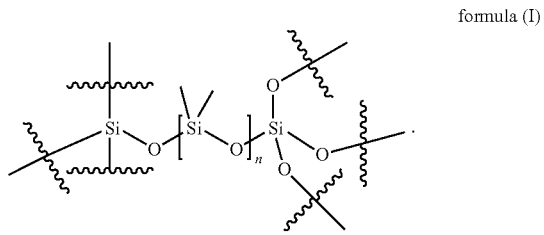

formula (I)

In this formula, n is 2 to 130 (e.g., 2 to 20 and 8 to 12).

The ionic liquid, constituting 20 to 90 wt % (e.g., 50 to 90 wt % and 75 to 90 wt %) of the ionic material, contains a cation and an anion. The cation can be 1-R-3-methylimidazolium, 1-R'-butylimidazolium, 1-R"-methylpyrrolidinium, or a combination thereof. Each of R and R', independently, is ethyl, butyl, hexyl, octyl, decyl, or benzyl, and R" is ethyl or butyl. The anion can be bis(trifluoromethanesulfonyl)imide, tetracyanoborate, tris(perfluoroethyl)trifluoro-phosphate, hexafluorophosphate, tetrafluoroborate, or a combination thereof. Examples of a suitable ionic liquid include, but are not limited to, 1-ethyl-3-methylimidazolium bis(trifluoromethanesulfonyl)imide, 1-butyl-3-methylimidazolium bis(trifluoromethane-sulfonyl)imide, 1-hexyl-3-methylimidazolium bis(trifluoromethanesulfonyl)imide, 1-butyl-3-methylpyrrolidinium bis(trifluoromethanesulfonyl)imide, 1-ethyl-3-methylimidazolium tetracyanoborate ("EMI TCB"), and 1-ethyl-3-methylimidazolium tris(perfluoroethyl)trifluorophosphate ("EMI TFSI").

Another ionic material of this invention contains a crosslinked PDMS network, an ionic liquid, and a lithium salt. The PDMS network and the ionic liquid are defined above. Examples of the lithium salt include lithium bis(trifluoromethanesulfonyl)imide, lithium hexafluorophosphate, and lithium tetrafluoroborate. Both the lithium salt and the ionic liquid are dispersed within the crosslinked PDMS network. The lithium salt constitutes 0.1 to 30% (e.g., 1 to 25% and 10 to 20%) of the ionic material. The molar ratio between the lithium salt and the ionic liquid can be 1:1 to 1:10 (e.g., 1:2 to 1:7 and 1:3 to 1:6).

The ionic material of this invention can be elastic, featuring a modulus of 0.1 to 1000 kPa (e.g., 45 to 100 kPa), a yield stress of 20 to 100 kPa (e.g., 30 to 40 kPa), and a strain at yield of 15 to 45% (35 to 45%). Further, the material can have an ionic conductivity of 0.01 to 100 mS/cm (e.g., 0.1 to 20 mS/cm) and a double-layer capacitance of 1 to 50 $\mu F/cm^2$ (e.g., 1 to 30 $\mu F/cm^2$).

Also within the scope of the invention is a method of preparing one of the ionic materials described above. The method includes the steps of: (i) combining an alkoxy-terminated PDMS oligomer, an acid, and an ionic liquid to form an ionic material; and (ii) optionally, casting the ionic material and allowing it to stand for 5 minutes to 72 hours at 20 to 100° C. to form a casted ionic material. The ionic material thus prepared contains a crosslinked PDMS network, within which the ionic liquid is dispersed. The ionic material can also contain a lithium salt. The alkoxy-terminated PDMS oligomer has a molecular weight of 350 to 10,000 Dalton (500 to 1000 Dalton). Examples for the ionic liquid and the lithium salt are enumerated above. The molar ratio between the alkoxy-terminated PDMS oligomer and the acid is 1:2 to 1:20 (e.g., 1:10 to 1:15). The ionic liquid is 15 to 67% (e.g., 20 to 67% and 50 to 67%) by volume of the mixture. The molar ratio between the lithium salt and the ionic liquid is 1:1 to 1:10 (e.g., 1:2 to 1:7 and 1:3 to 1:6).

Still within the scope of this invention are ionic materials prepared by the method described above.

Yet still within the scope of this invention are a battery and a capacitor each including the above-described ionic material as an electrolyte. An example is a flexible battery that includes as an electrolyte an ionic material of this invention containing a lithium salt.

The details of one or more embodiments of the invention are set forth in the description and the drawings below. Other features, objects, and advantages of the invention will be apparent from the description, the drawings, and also from the claims.

DETAILED DESCRIPTION

Figure 1:
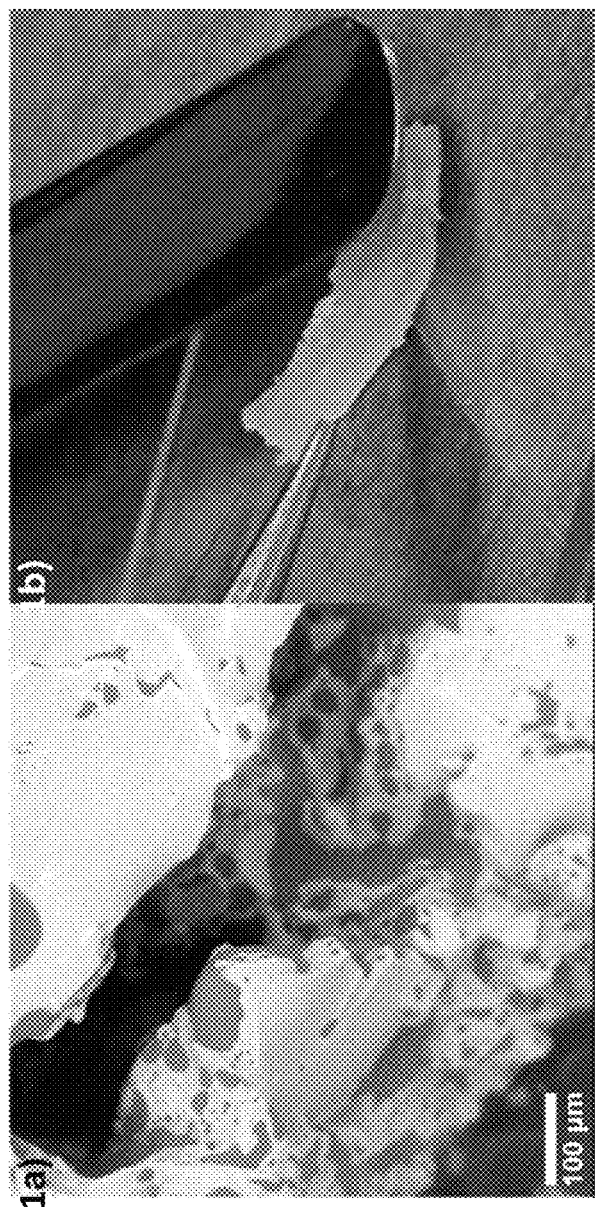
FIG. 1 includes two graphs (1a and 1b) showing a scanning electron microscope image and a photograph of ionogel IM1 of this invention.

As pointed out above, the ionic material of this invention can be prepared by agitating a mixture of an alkoxy-terminated PDMS oligomer, an acid, and an ionic liquid. Optionally, a lithium salt is also added. This mixture, after stirring for 5 minutes to 72 hours (e.g., 15 minutes to 6 hours and 30 minutes to 1.5 hours) at 20 to 100° C., solidifies into a free-standing gel form when left undisturbed. Also see K. G. Sharp, *J. Sol-Gel Sci. Technol.* 1994, 2, 35-41.

After the stirring step, a free-standing gel or film can also be prepared using a molding (e.g., injection molding), 3D printing, or casting (e.g., spreading onto a surface and extruding into a coagulation bath) process.

In one embodiment, the alkoxy-terminated PDMS oligomer (e.g., trimethoxy-terminated PDMS oligomer and triethoxy-terminated PDMS oligomer) has a chemical structure as follows:

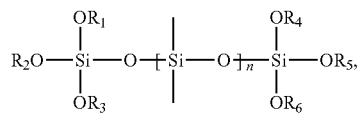

in which n is 2 to 130 (e.g., 2 to 20 and 8 to 12), and at least one of $R_1$-$R_6$ is a $C_1$-$C_{10}$ alkyl group and the others can be H. The term "alkyl" refers to a monovalent straight or branched hydrocarbon. Examples include methyl, ethyl, n-propyl, iso-propyl, n-butyl, iso-butyl, and tert-butyl. In the trimethoxy-terminated PDMS oligomer, each of $R_1$-$R_6$ is methyl. The term "alkoxy" refers to an —O— alkyl.

After being crosslinked, the alkoxy-terminated PDMS oligomer turns into a repeat unit of formula (I) shown above in the PDMS network. The repeat unit bonds to another repeat unit via a Si—O covalent bond.

The acid catalyzes the crosslinking reaction of the alkoxy-terminated PDMS oligomer to form a PDMS network, which typically constitutes 10-80 wt % (e.g., 10-50%) of the ionic material. Examples of a suitable acid include, but are not limited to, formic acid, acetic acid, methanesulfonic acid, p-toluenesulfonic acid, trifluoroacetic acid, boric acid, hydrochloric acid, and sulfuric acid. By-products of the crosslinking reaction include water, esters, and alcohols. They, together with the acid, are easily removed by evaporation at ambient temperature.

Any ionic liquid that has a melting point of 100° C. or lower (e.g., 25° C. or lower) can be used to generate ionic materials which exhibit a melting point of 300° C. or lower.

The lithium salt provides lithium ions dispersed in the PDMS network. Any salt containing lithium ions can be used. Examples of a suitable lithium salt include LiCl, $LiPF_6$, $LiBF_4$, $LiClO_4$, lithium bis(trifluoromethanesulfonyl)imide, lithium tetracyanoborate, lithium tris(perfluoroethyl)trifluoro-phosphate, lithium hexafluorophosphate, and lithium tetrafluoroborate.

The ionic material of this invention is thermally stable up to a temperature of 300° C. (e.g., 200° C. and 100° C.). It can stay as a solid or a semi-solid and not free-flowing at a temperature above 100° C. (e.g., 200° C. and 300° C.).

This ionic material can be elastic, having a yield stress of 20 to 100 kPa and a strain at yield of 15 to 45%. The term "yield stress" refers to the stress at which a predetermined amount of permanent deformation occurs. A material, when subjected to a stress less than the yield stress, deforms elastically and, upon removal of the stress, returns to its original shape. On the other hand, subjected to a stress that exceeds the yield stress, at least a part of the deformation becomes permanent and non-reversible. The term "strain at yield" refers to the strain at which the material no longer exhibits elastic behavior.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

Preparation of Ionic Materials

Seven ionic materials of this invention including five that did not contain lithium, i.e., ionogel IM1-IM5, and two that contained lithium, i.e., 0.175 M $Li^+$ ionogel and 1M $Li^+$ ionogel, were prepared following the general procedure described above.

More specifically, ionogel IM1 was prepared by mixing triethoxy-terminated PDMS oligomer (MW about 800 Dalton; 0.315 mL, 0.38 mmol), formic acid (98%; 0.185 mL, 4.9 mmol), and ionic liquid EMI TCB (0.5 mL, 2.3 mmol) in a container equipped with a magnetic stirring bar. The molar ratio between the PDMS oligomer and formic acid was 1:13 and EMI TCB was 50% by volume. The mixture was stirred for 30 minutes at room temperature to obtain a resin, which was consequently sealed in a mold and left undisturbed for 2 hours to form a free-standing ionogel, i.e., IM1, which contains EMI TCB 80 wt % determined using a thermogravimetric analysis. For the procedure of a thermogravimetric analysis, see Horowitz and Panzer, Journal of Material Chemistry 2012, 22, 16534-39.

Ionogel IM2 was prepared in a way similar to ionogel IM1 except that 1-ethyl-3-methylimidazolium bis(trifluoromethanesulfonyl)imide ("EMI TFSI") was used instead of EMI TCB.

Ionogel IM3 was prepared following the procedure for preparing IM1 except that the reaction mixture was stirred at 80° C. for 15 minutes.

Ionogel IM4 was prepared following the procedure for preparing IM1 except that acetic acid, instead of formic acid, was used.

Ionogel IM5 was prepared following the procedure for preparing IM1 except that the molar ratio between the PDMS oligomer to formic acid was 1:6. This ionogel contained EMI TCB 50 wt % determined using thermogravimetric analysis.

0.175 M $Li^+$ ionogel was prepared following the procedure for preparing IM1 except that the ionic material further contained 0.175 M Li TFSI.

Finally, 1M $Li^+$ ionogel was prepared following the procedure for preparing IM2 except that the ionic material further contained 1 M Li TFSI.

Ionogel IM1 was subjected to scanning electron microscope (SEM) imaging, dynamic mechanical analysis, and differential scanning calorimetry (DSC) analysis. See below and Horowitz and Panzer, Angew Chem Int Ed Engl. 2014, 53(37):9780-9783. The ionic conductivity and capacitance of ionogels that included those containing lithium or containing no lithium were measured and the results were summarized in Tables 1 and 2 below.

SEM Image

A SEM image of ionogel IM1 shows that the ionic liquid (gray) was dispersed in the crosslinked PDMS network (white). See FIG. 1a.

The PDMS network without any ionic liquid is brittle and crumbly. Containing ionic liquid EMI TCB, ionogel IM1 was a colorless and translucent, elastic, bendable gel. It can bend under mild force. See FIG. 1b.

Dynamic Mechanical Analysis

Figure 2:
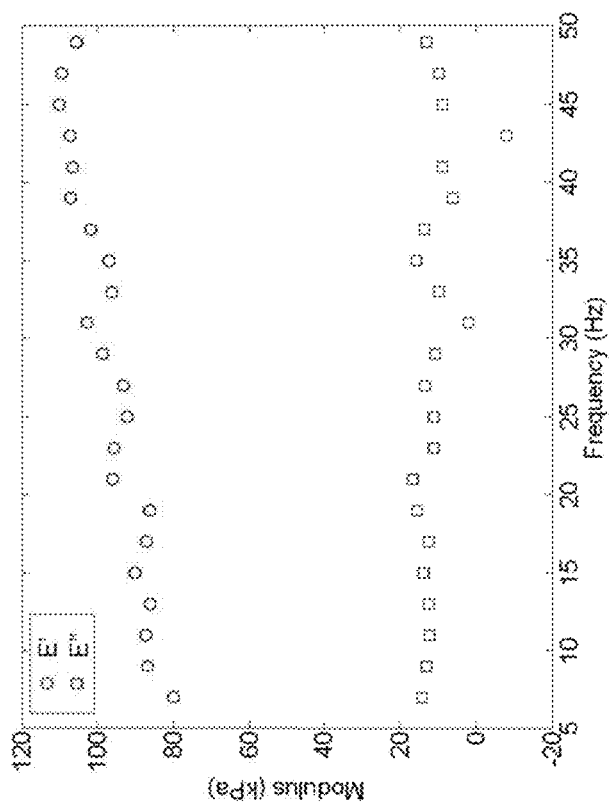
FIG. 2 shows frequency sweep data for ionogel IM1 of this invention.

The mechanical characteristics of ionogel IM1 were examined using dynamic mechanical analysis. When subjected to a frequency sweep at 5% strain, ionogel IM1 was a solid, elastic ionic material having a modulus of about 80 kPa with very little viscous response. See FIG. 2. In this figure, the storage modulus (E') is higher than the loss modulus (E") over the entire frequency range, indicating primarily elastic, solid-like behavior.

Figure 3:
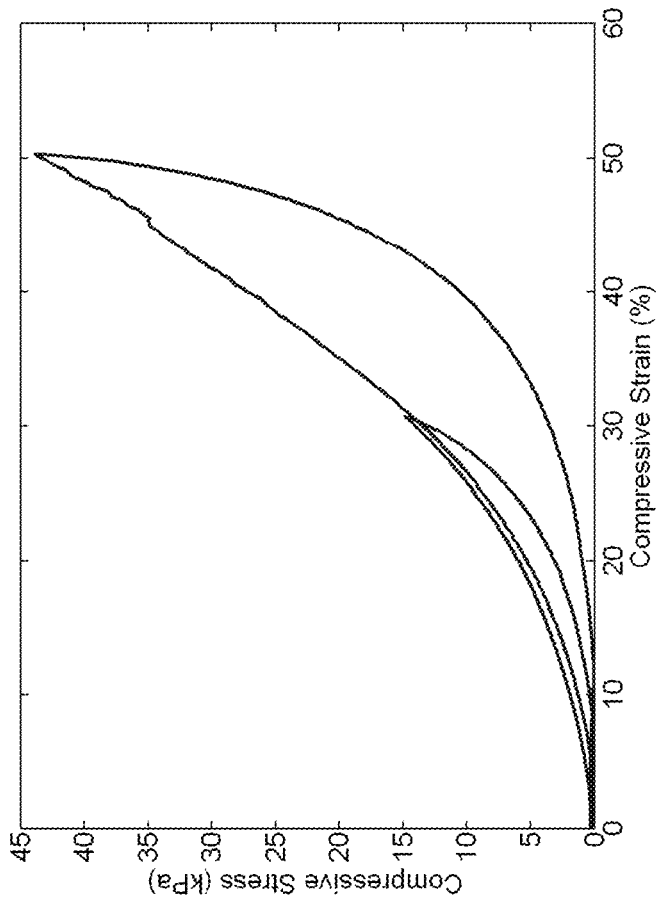
FIG. 3 shows stress/strain curves for ionogel IM1 of the present invention.

This ionogel was also subjected to compressive strain at a constant rate of 0.015 mm/s. It responded elastically with hysteresis and could withstand at least 30% compressive strain. See FIG. 3.

DSC Analysis

Figure 4:
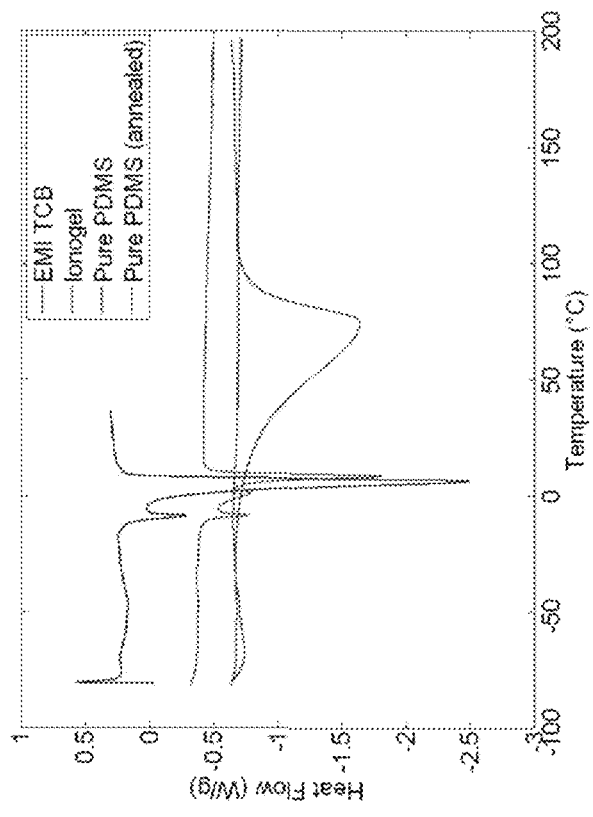
FIG. 4 shows differential scanning calorimetry heating curves for ionic liquid EMI TCB, a pure PDMS network, an annealed PDMS network, and ionogel IM1 of the present invention.

DSC analysis was carried out on ionogel IM1, which was first heated to 40° C. to erase any thermal history. After cooling, it was heated at a rate of 10° C./minute. The results are shown in FIG. 4. The DSC heating curve of EMI TCB had two dips around 10° C., indicating melting of EMI TCB. A PDMS network (i.e. pure PDMS) free of any ionic liquid had a broad dip at around 50° C., indicating unreacted end groups present in the network. When the PDMS network was annealed 50° C. for two hours, no broad dip was observed in the DSC heating curve of the annealed pure PDMS material. Similar to the annealed PDMS material, ionogel IM1 did not show a broad dip around 50° C., indicating that there were no unreacted end groups present in this ionic material. On the other hand, its DSC heating curve had dips around 10° C. similar to that observed in the EMI TCB curve. As demonstrated in FIG. 4, ionogel IM1 was thermally stable until at least 200° C., the highest temperature used in this DSC analysis. At 200° C., ionogel IM1 remained as a solid or semi-solid.

Ionic Conductivity and Double-Layer Capacitance

Ionic conductivities and double-layer capacitances of ionogels IM1 and IM5 were measured following the procedure described in Horowitz and Panzer, Journal of Material Chemistry 2012, 22, 16534-39.

Room temperature measurements were carried out on samples that were sandwiched between planar stainless steel blocking electrodes in a parallel cell. Temperature-variant measurements were taken on samples cast on a glass substrate and contacted with the probes of a Linkam temperature stage. Impedance measurements were taken using a Princeton Applied Research VersaStat 3 potentiometer. A 10 mV AC ripple was applied to each sample over a window of 1 MHz to 0.01 Hz frequency. Capacitance and ionic conductivity values were determined from impedance data using glassy carbon blocking electrodes. Capacitance values were calculated using the value of the imaginary component impedance at 5 Hz. Conductivity values were calculated using the value of the real component of impedance at or above 100 kHz. Calculations followed the formulae described in Horowitz and Panzer (2012).

The results are shown in Table 1 below. Note that ionogel IM1 contained a higher percentage of ionic liquid EMI TCB than ionogel IM5, i.e., 80 wt % vs. 50 wt %. Ionogel IM1 had a capacitance similar to that of EMI TCB and an ionic conductivity much higher than ionogel IM5. Indeed, by modifying the formulation of an ionic material to have a higher ionic liquid content, the ionogel thus produced is expected to exhibit a higher conductivity.

TABLE 1

Ionogel electrical properties as compared to the neat ionic liquid (EMI TCB).

| | EMI TCB | IM5 | IM1 |
|---|---|---|---|
| Conductivity (mS/cm) | 12.6 | 0.1 | 3.1 |
| Capacitance ($\mu F/cm^2$) | 18 | 6 | 10 |

Further, ionic conductivities of ionogels that contained lithium, i.e., 0.175 M $Li^+$ ionogel and 1M $Li^+$ ionogel, were also measured following the procedure described above. The results are shown in Table 2 below.

TABLE 2

Ionic conductivities of 0.175M Li+ ionogel and 1M Li+ ionogel.

| | 0.175M Li+ ionogel | 1M Li+ ionogel |
|---|---|---|
| Conductivity (mS/cm) | 2.2 | 0.6 |

Figure 5:
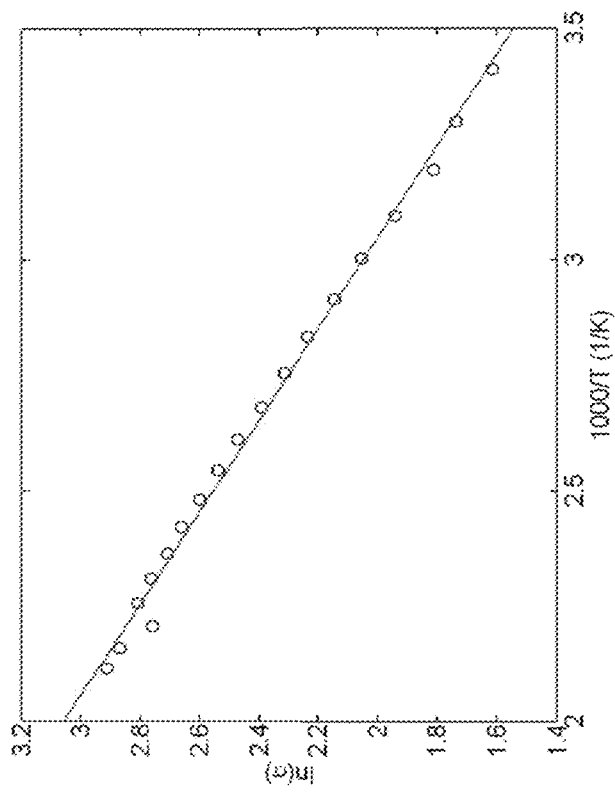
FIG. 5 shows an Arrhenius plot for ionogel IM1 of the present invention.

Moreover, ionogel IM1's conductivity demonstrated Arrhenius-type activation with temperature, indicating that the ionic conductivity increases while the temperature increases. See FIG. 5. In this figure, an Arrhenius plot showed variation of ionogel conductivity with temperature. The plot was linear ($R^2$=0.99). The sample was heated to 200° C. and cooled to 20° C., with an impedance spectrum taken every 10° C. over cooling (after allowing temperature equilibration). Activation energy from this linear fit was 8.4 kJ/mole.

Figure 6:
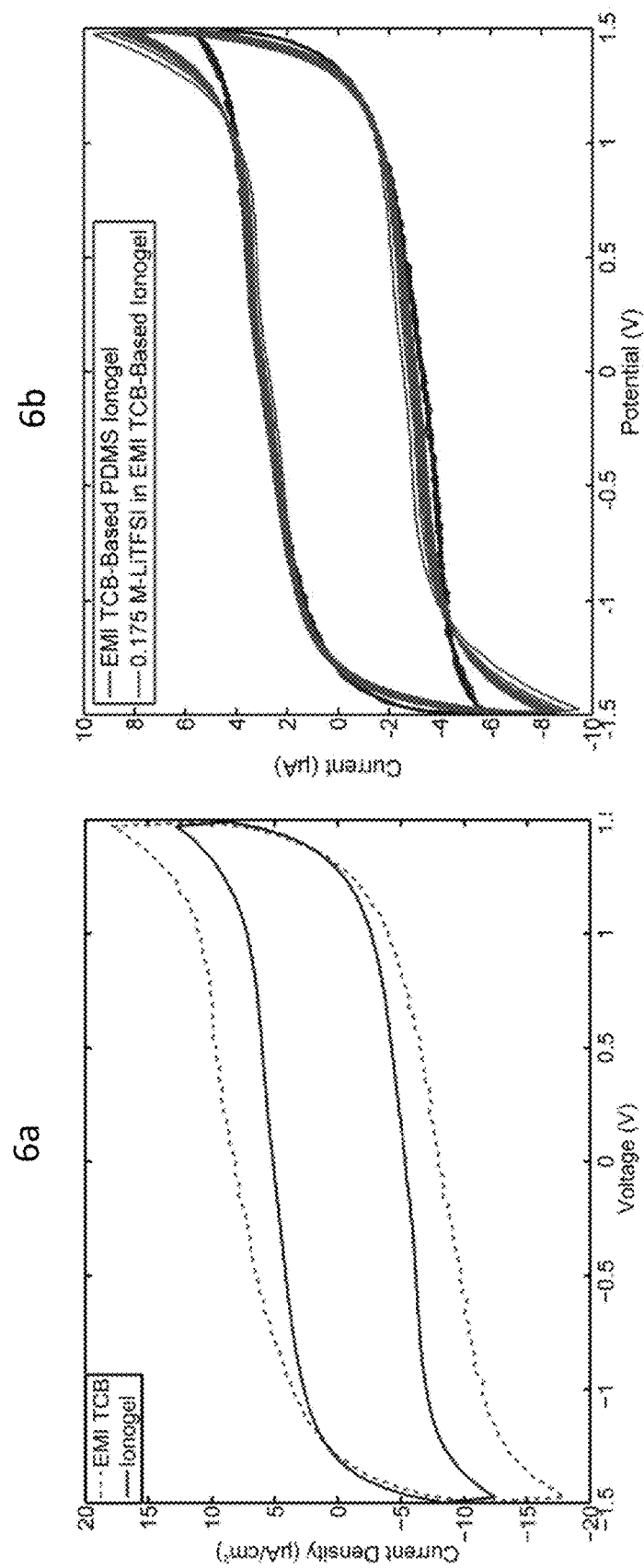
FIG. 6 includes two graphs (6a and 6b) showing the capacitive behaviors of neat ionic liquid EMI TCB and ionogels of the present invention.

In addition, the capacitive behaviors of ionogels were tested in a two-electrode setup. FIGS. 6a and 6b show that two ionogels of this invention, i.e., ionogel IM1 and 0.175 M Li$^+$ ionogel, each had a stability window of at least 3V. Neat ionic liquid EMI TCB was used as a control in the test.

Figure 7:
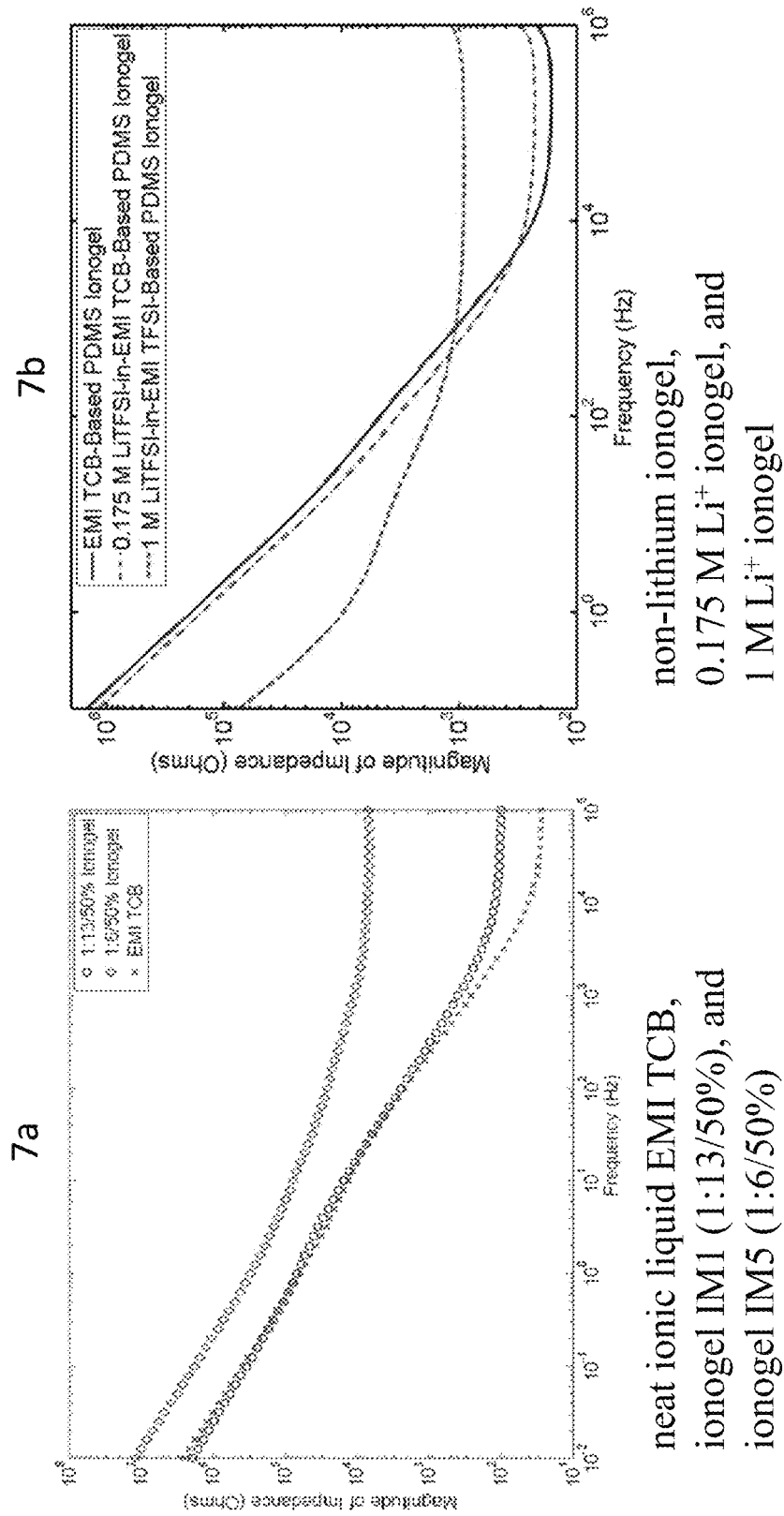
FIG. 7 includes two graphs (7a and 7b) showing the impedance spectra of neat ionic liquid EMI TCB and ionogels of the present invention.

The impedance spectra of four ionogels of this invention are shown in FIG. 7. More specifically, FIG. 7a shows impedance spectra of ionogel IM1 (1:13/50%) and ionogel IM5 (1:6/50%), whereas FIG. 7b shows those of 0.175 M Li$^+$ ionogel and 1M Li$^+$ ionogel. Neat ionic liquid EMI TCB served as a control. These spectra were recorded using planar stainless steel electrodes.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Indeed, based on the above disclosure, one skilled in the art can design an ionic material that contains any combination of a PDMS network, an ionic liquid, and a lithium salt. Further, the ratios among the components can be so engineered to achieve desired thermal stability, mechanical flexibility, and ionic conductivity.

From the above description, a skilled artisan can easily ascertain the essential characteristics of the present invention, and without departing from the spirit and scope thereof, can make various changes and modifications of the invention to adapt it to various usages and conditions. Thus, other embodiments are also within the claims.

The invention claimed is:

1. An ionic material comprising a crosslinked polydimethylsiloxane (PDMS) network and an ionic liquid dispersed within the crosslinked PDMS network, wherein the ionic liquid constitutes 20 to 90 wt % of the ionic material, and the crosslinked PDMS network containing a plurality of repeating units of formula (I):

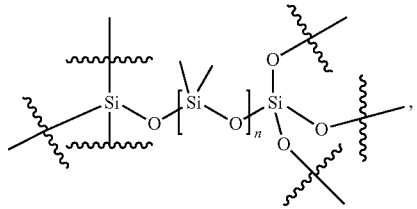

formula (I)

in which n is 2 to 130.

2. The ionic material of claim 1, wherein n is 2 to 20 and the ionic liquid constitutes 50 to 90 wt % of the ionic material.

3. The ionic material of claim 2, wherein n is 8 to 12 and the ionic liquid constitutes 75 to 90 wt % of the ionic material.

4. The ionic material of claim 3, wherein the ionic liquid contains a cation and an anion, in which the cation is 1-R-3-methylimidazolium, 1-R'-butylimidazolium, 1-R"-methylpyrrolidinium, or a combination thereof, each of R and R', independently, being ethyl, butyl, hexyl, octyl, decyl, or benzyl, and R" being ethyl or butyl; and the anion is bis(trifluoromethanesulfonyl)imide, tetracyanoborate, tris(perfluoroethyl)trifluorophosphate, hexafluorophosphate, tetrafluoroborate, or a combination thereof.

5. The ionic material of claim 4, wherein the ionic material has a modulus of 0.1 to 1000 kPa, a yield stress of 20 to 100 kPa, a strain at yield of 15 to 45%, an ionic conductivity of 0.01 to 100 mS/cm, and a double-layer capacitance of 1 to 50 μF/cm$^2$.

6. The ionic material of claim 5, wherein the ionic material has a modulus of 45 to 100 kPa, a yield stress of 30 to 40 kPa, a strain at yield of 35 to 45%, an ionic conductivity of 0.1 to 20 mS/cm, and a double-layer capacitance of 1 to 30 μF/cm$^2$.

7. The ionic material of claim 4, wherein the ionic liquid is
1-ethyl-3-methylimidazolium bis(trifluoromethanesulfonyl)imide,
1-butyl-3-methylimidazolium bis(trifluoromethanesulfonyl)imide,
1-hexyl-3-methylimidazolium bis(trifluoromethanesulfonyl)imide,
1-butyl-3-methylpyrrolidinium bis(trifluoromethanesulfonyl)imide,
1-ethyl-3-methylimidazolium tetracyanoborate, or
1-ethyl-3-methylimidazolium tris(perfluoroethyl)trifluorophosphate.

8. The ionic material of claim 7, wherein the ionic material has a modulus of 0.1 to 1000 kPa, a yield stress of 20 to 100 kPa, a strain at yield of 15 to 45%, an ionic conductivity of 0.01 to 100 mS/cm, and a double-layer capacitance of 1 to 50 g/cm$^2$.

9. The ionic material of claim 8, wherein the ionic material has a modulus of 45 to 100 kPa, a yield stress of 30 to 40 kPa, a strain at yield of 35 to 45%, an ionic conductivity of 0.1 to 20 mS/cm, and a double-layer capacitance of 1 to 30 g/cm$^2$.

10. The ionic material of claim 1, wherein the ionic material has a modulus of 0.1 to 1000 kPa, a yield stress of 20 to 100 kPa, and a strain at yield of 15 to 45%.

11. The ionic material of claim 10, wherein the ionic material has a modulus of 45 to 100 kPa, a yield stress of 30 to 40 kPa and a strain at yield of 35 to 45%.

12. The ionic material of claim 1, wherein the ionic material has an ionic conductivity of 0.01 to 100 mS/cm and a double-layer capacitance of 1 to 50 μF/cm$^2$.

13. The ionic material of claim 12, wherein the ionic material has an ionic conductivity of 0.1 to 20 mS/cm and a double-layer capacitance of 1 to 30 μF/cm$^2$.

14. An ionic material comprising a crosslinked polydimethylsiloxane (PDMS) network, an ionic liquid, and a lithium salt, wherein both the ionic liquid and the lithium salt are dispersed within the crosslinked PDMS network, the ionic liquid constitutes 20 to 90 wt % of the ionic material, the molar ratio between the lithium salt and the ionic liquid is 1:1 to 1:10, and the crosslinked PDMS network containing a plurality of repeating units of formula (I) recited in claim 1.

15. The ionic material of claim 14, wherein the ionic liquid constitutes 50 to 90 wt % of the ionic material and the molar ratio between the lithium salt and the ionic liquid is 1:2 to 1:7.

16. The ionic material of claim 14, wherein the ionic liquid contains a cation and an anion, in which the cation is 1-R-3-methylimidazolium, 1-R'-butylimidazolium, 1-R"-methylpyrrolidinium, or a combination thereof, each of R and R', independently, being ethyl, butyl, hexyl, octyl, decyl, or benzyl, and R" being ethyl or butyl; and the anion is bis(trifluoromethanesulfonyl)imide, tetracyanoborate, tris(perfluoroethyl)-trifluorophosphate, hexafluorophosphate, tetrafluoroborate, or a combination thereof.

17. The ionic material of claim 16, wherein the ionic material has a modulus of 0.1 to 1000 kPa, a yield stress of 20 to 100 kPa, a strain at yield of 15 to 45%, an ionic conductivity of 0.01 to 100 mS/cm, and a double-layer capacitance of 1 to 50 µF/cm².

18. The ionic material of claim 17, wherein the ionic material has a modulus of 45 to 100 kPa, a yield stress of 30 to 40 kPa, a strain at yield of 35 to 45%, an ionic conductivity of 0.1 to 20 mS/cm, and a double-layer capacitance of 1 to 30 µF/cm².

19. The ionic material of claim 16, wherein the ionic liquid is
- 1-ethyl-3-methylimidazolium bis(trifluoromethanesulfonyl)imide,
- 1-butyl-3-methylimidazolium bis(trifluoromethanesulfonyl)imide,
- 1-hexyl-3-methylimidazolium bis(trifluoromethanesulfonyl)imide,
- 1-butyl-3-methylpyrrolidinium bis(trifluoromethanesulfonyl)imide,
- 1-ethyl-3-methylimidazolium tetracyanoborate, or
- 1-ethyl-3-methylimidazolium tris(perfluoroethyl)trifluorophosphate.

20. The ionic material of claim 19, wherein the ionic material has a modulus of 0.1 to 1000 kPa, a yield stress of 20 to 100 kPa, a strain at yield of 15 to 45%, an ionic conductivity of 0.01 to 100 mS/cm, and a double-layer capacitance of 1 to 50 µF/cm².

21. A battery or a capacitor comprising the ionic material of claim 1 as an electrolyte.

22. A battery or a capacitor comprising the ionic material of claim 14 as an electrolyte.

* * * * *